Feb. 18, 1969     P. J. CHRISTOPHER     3,428,078
FLOAT VALVES
Filed June 9, 1966

APPLICANT
Peter James Christopher
BY
  Misegades & Douglas
    ATTORNEYS

United States Patent Office 3,428,078
Patented Feb. 18, 1969

3,428,078
FLOAT VALVES
Peter James Christopher, Rugby, England, assignor to
The English Electric Company Limited, London, England, a company of Great Britain
Filed June 9, 1966, Ser. No. 556,450
Claims priority, application Great Britain, June 10, 1965, 24,630/65
U.S. Cl. 137—416
Int. Cl. F16k 31/22, 33/00, 1/54
6 Claims

ABSTRACT OF THE DISCLOSURE

In a float valve for a fluid chamber which may be subjected to changes in fluid level, the chamber having an air vent associated therewith, the float therefor is in the form of a first enclosed chamber providing an initial buoyancy to the float and a second chamber having a first lower opening and a second upper vent opening. These openings permit the second chamber to be filled as the fluid level in said chamber rises, hence increasing the weight of the float ready for a next fall in fluid level, and permit fluid to drain from the second chamber as the fluid level in said chamber falls, hence increasing the buoyancy of the float ready for the next rise in fluid level. The float carries a valve member which moves between open and closed positions with respect to the air vent in response to movement of the float.

---

This invention relates to float valves including a hollow float arranged for immersion in a fluid and a valve member arranged for movement between open and closed positions in response to movement of the float whereby to bring a duct into communication with said fluid.

Such valves are well-known, for example as a means for restoring the water level in a cistern to its normal level. Most float valves incorporate a float on a relatively long lever arm which may be pivoted, giving the float a much greater movement than the valve member, so that the force applied to the valve member is substantially greater than the force raising or lowering the float.

It is not always possible, however, to provide such a long lever arm, due to space limitations.

One typical application in which this problem may arise is in a vent valve for admitting air to the top of a cooler in a dry-cooling tower installation, when the water level therein drops below a predetermined value. In such cases, a typical ratio of lengths about the lever arm pivot might be seven to one between the float and valve flap. If a greater closing force is required than is provided by the lever arm length ratio, therefore, and if this ratio cannot be increased, a float of greater buoyancy may be used instead. However, this reduces the force available for opening the valve: this would be compensated for by increasing the weight of the float. These two requirements are, however, incompatible in conventional floats.

With the arrangement of this invention, greater buoyancy of the float is provided for closing the valve, and greater weight for opening it.

Preferably, where the valve is arranged for installation in a vessel in which the level of said fluid is arranged to rise and fall at a rate greater than a predetermined rate, the cross-sectional area of said lower opening in said second chamber is such as to permit said fluid to pass into and out of said second chamber only at a rate lower than said predetermined rate.

Figure 1:
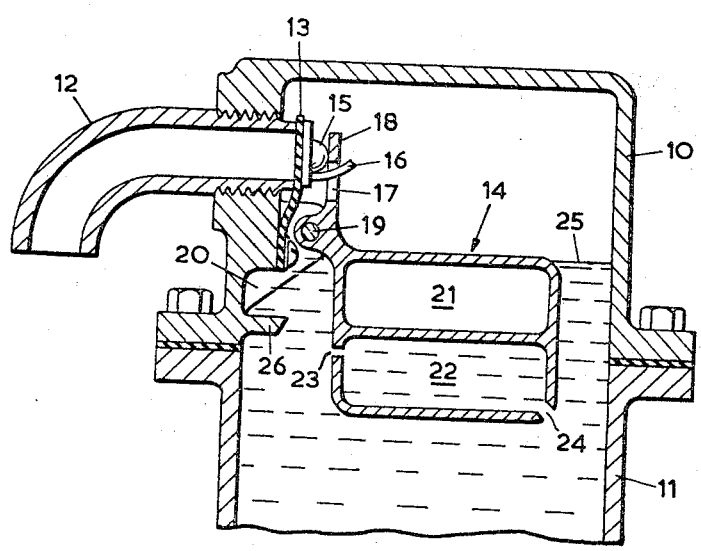
Figure 2:
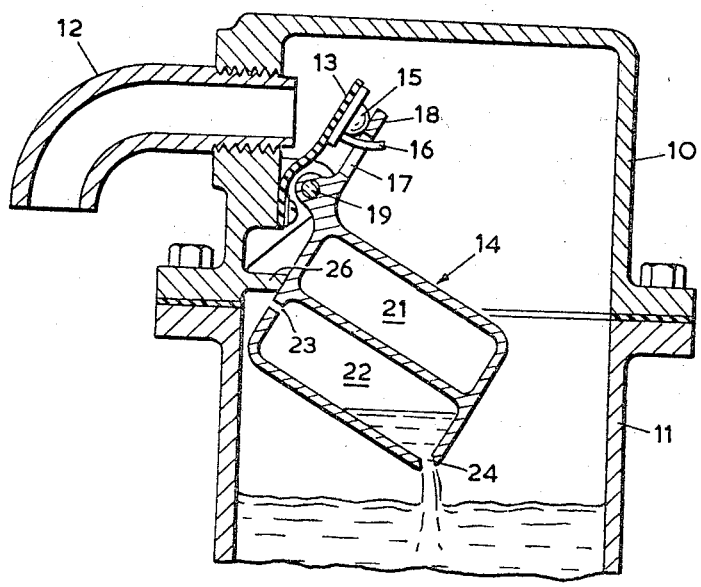

One float valve in a preferred form according to the invention, for controlling air flow in response to changes in a water level, will now be described by way of example and with reference to the accompanying drawings, of which FIGS. 1 and 2 are sectional elevations of the valve in its closed and open positions respectively.

The float valve in this example is a vent valve suitable for installation in a covered water-containing vessel in which the water level varies. One example of such a vessel is a header on top of a heat exchange element or cooler forming part of a dry cooling tower installation, in which hot condensate from a steam turbine condenser is cooled by indirect heat exchange with air in the heat-exchange element.

The valve is arranged in the cover 10 of a vertical vent pipe 11 on top of the said vessel (not shown), a breather pipe 12 being fixed in the cover 10 to communicate with atmosphere. The valve comprises a flexible flap 13 operated by a float 14 to cover or uncover the end of the breather pipe 12 inside the cover 10. The flap 13, which may be of any suitable material, is fixed at one end to the inside of the cover 10, and has at its other end a part-spherical seating 15 and a latch bar 16, the latter projecting through a slot 17 in a float arm 18 which is rigidly connected to, or integral with, the float 14. The float 14 is pivoted, through a pivot rod 19, on a bracket 20 integral with the cover 10. A positive stop 26 projects from the wall of the cover 10, to limit downward movement of the float 14.

The float 14 comprises a generally-rectangular hollow vessel divided into an upper total-enclosed chamber 21 containing air (although it may alternatively contain some other suitable gas, or be evacuated), and a lower chamber 22. The lower chamber 22 may be of the same dimensions as the upper chamber 21, and has an air vent 23 near the top of its outer wall on the side nearest the pivot 19 and a water passage 24 through the wall on the bottom edge thereof furthest from the air vent 23. The water passage 24 is larger than the air vent 23.

In operation, when the water in the vent pipe 11 is at a level shown at 25 in FIG. 1, the float 14 being submerged and the chamber 22 thus full of water, the float arm 18 bears against the seating 15 so as to hold the flap 13 against the end of the breather pipe 12 and thus keep the valve in the closed position shown in FIG. 1.

If the water level now falls, the combined weight of the float 14 and of the water in chamber 22 causes the float to rotate clockwise (as seen in the drawings) towards the open position shown in FIG. 2. As the float rotates, the float arm 18 pushes the latch bar 16 outwards and downwards, so opening the valve and allowing air to enter through the breather pipe 12. The rotary movement of the float stops when the latter comes to rest against the stop 26.

As the water level falls, the water in the chamber 22 drains through the passage 24, air at the same time entering the chamber 22 through the vent 23. The passage 24 is made of such a cross-sectional area that the water passes through it at a predetermined rate which is preferably less than the rate at which the level of water in the vent pipe 11 falls.

When the water level again rises in the vent pipe 11 and reaches the float 14, the latter rotates anticlockwise (as seen in the drawings), the float arm 18 pushing on the seating 15 so as to close the valve. The water level may rise faster than water can enter the chamber 22 through the passage 24, and the cross-sectional area of the latter is preferably made so that this is so. Air can then leave the chamber 22 through the vent 23 in the form of bubbles, since the vent 23 is at a higher level than passage 24.

It will be understood that both the effective weight and the buoyancy of the float 14 vary during the opening and closing of the valve, the effective weight and buoyancy being at their greatest at the beginning of the opening and closing operations respectively. Opening and closing are thus initiated as quickly as possible.

Valves such as those described herein can be used in any application where a float valve is required, not only in air vent valves but for the control of any fluid where such control is to be responsive to the level of the same or another fluid, or to changes in density thereof.

For example, if for the breather pipe 12 a water inlet is substituted, a drop in the water level 25 will open the valve so as to admit more water and thereby restore the water level. Such a valve would be useful in a cistern or other liquid-storage tank, for example.

If the density of the fluid in which the float is immersed changes sufficiently, the valve will open and so admit a fluid through the pipe 12 or a similar pipe. For example, if the water in pipe 11 should boil, cold water could thus be introduced by the valve so as to cool the boiling water, sufficient space being provided to accommodate the amount of cold water necessary to reduce the valve temperature, and increase its density, enough to close the valve again.

The sealed chamber 21 is optional, though preferable: if provided, it may be arranged in any desired position relative to the chamber 22, provided the passage 24 remains at or near the bottom of the float.

It will be understood that the breather pipe 12 need not be provided: for example a mere hole in the cover 10 may be all that is needed.

I claim:
1. A float valve for a fluid chamber which may be subjected to changes in fluid level, said chamber having an opening for a duct, the float valve being of the kind including a hollow float and a valve member carried by said float which is arranged for movement between open and closed positions with respect to said opening in response to movement of said float, characterized in that the float includes a first enclosed chamber providing an initial buoyancy to the float, and a second chamber having a first lower opening and a second upper vent opening for permitting said second chamber to be filled through said first lower opening as the fluid level in said fluid chamber rises, thereby increasing the effective weight of the float ready for a next fall in the fluid level, and for permitting fluid to be drained from said second chamber through said first lower opening as the fluid level in said fluid chamber falls, thereby increasing the effective buoyancy of the float ready for the next rise in fluid level.

2. A float valve according to claim 1, and which is adapted for use in a fluid chamber in which the level of said fluid is arranged to rise and fall at a rate greater than a predetermined rate, characterized in that said second chamber has a first lower opening, the cross-sectional area of which is chosen to permit said fluid to pass into and out of said second chamber only at a rate lower than said predetermined rate.

3. A float valve according to claim 1, characterized in that said first chamber is above the level of said second chamber.

4. A float valve according to claim 1, characterized in that said float is pivoted about an axis fixed with respect to said inlet opening of the fluid chamber, and a projecting arm is provided on said float which is movable about said axis with said float so as to engage the valve member whereby to open and close the valve.

5. A float valve according to claim 4, characterized in that said valve member is flexible, and a projecting latch bar is carried by the valve member and is engaged by said projecting arm so that the valve member is moved from its closed position as the fluid level in the fluid chamber falls.

6. A float valve according to claim 5, characterized in that a projecting seating portion is provided on said valve member which is also engaged by said projecting arm so that the valve member is pushed from said open position by said arm as the fluid level in the fluid chamber rises.

References Cited

UNITED STATES PATENTS

| 571,065 | 11/1896 | Clarke | 137—448 X |
| 2,238,158 | 4/1941 | Cross | 137—435 X |
| 2,464,174 | 3/1949 | Carr et al. | 137—185 |

WILLIAM F. O'DEA, *Primary Examiner.*

D. R. MATTHEWS, *Assistant Examiner.*

U.S. Cl. X.R.

73—322.5; 137—185, 202, 423, 427, 448